Patented May 24, 1932

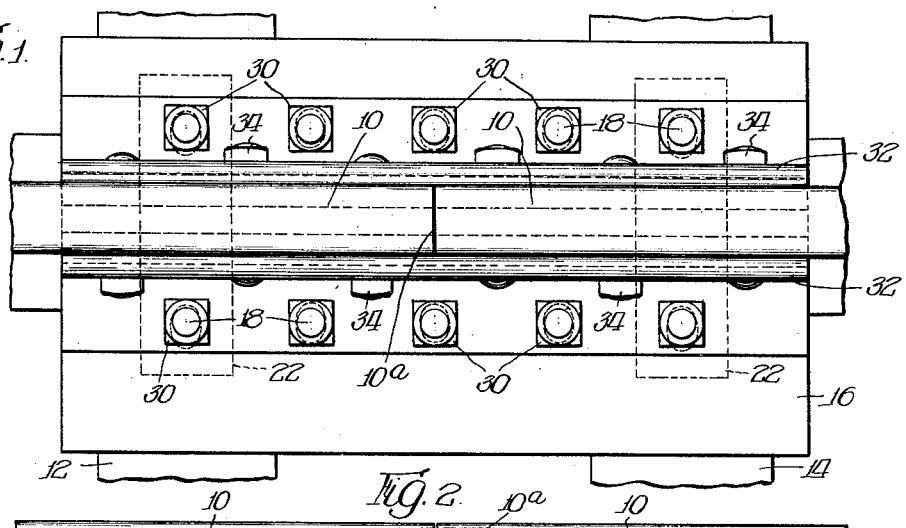
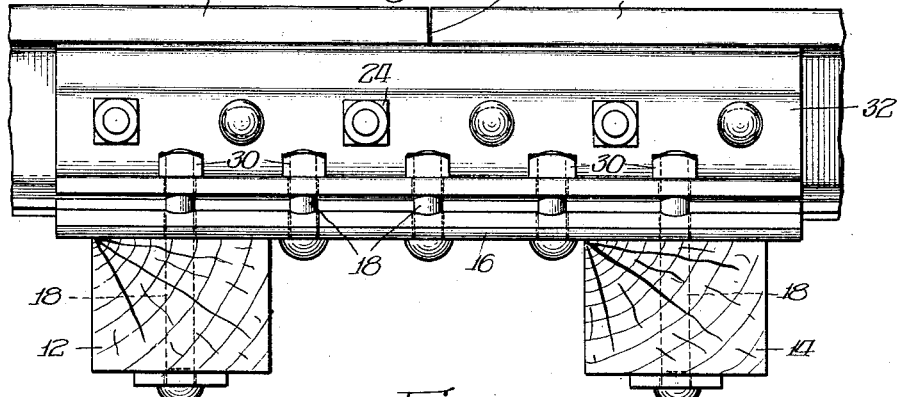
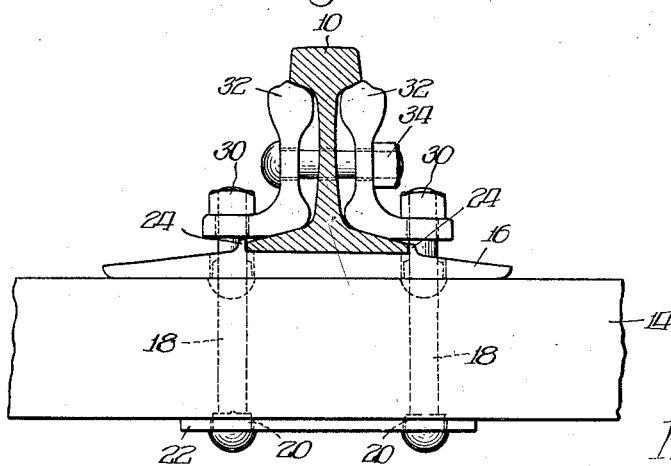

1,859,729

UNITED STATES PATENT OFFICE

JOHN BRUNNER, OF CHICAGO, ILLINOIS

RAIL JOINT

Application filed June 12, 1930. Serial No. 460,668.

This invention relates to rail joint structures and is illustrated herein as embodied in a joint of much the same style as that disclosed in my co-pending applications, Serial Numbers 460,667 and 460,669 filed on this date.

An object of the present invention is to provide a novel and improved type of rail joint which will serve efficiently in joining together abutting ends of rail sections to prevent excessive relative movement between them and likewise to prevent excessive relative movement between such members and the ties upon which they are disposed.

Other objects will become apparent during the reading of the following specification in the light of the accompanying drawings, in which—

Figure 1 is a plan view showing a segment of rail section passing over two ties and secured thereto in accordance with the present invention;

Figure 2 is a view in side elevation of the assemblage shown in Figure 1; and

Figure 3 is a view in end elevation of the same.

As shown herein the assemblage comprises the rail sections 10, 10 abutting one another along the line 10a and mounted upon ties 12 and 14. Interposed between the base flanges of the rail section 10 and the ties is a tie plate 16 provided with the customary positioning shoulders 24.

To prevent excessive relative movement between the adjacent extremities of the rails the assemblage is provided with splice bars 32 having outwardly extending base sections, lying upon opposite sides of the web of the rail sections, and joined together by means of fasteners 34 extending through aligned openings in the splice bars and the web.

To the end of holding the rail firmly in engagement with the tie plate there are provided fasteners 18 extending completely through the ties and engaging at the lower surface of the tie with a washer 22. In order to prevent rotation of the bolts or fasteners 18 while the parts are being assembled, the shanks of the bolts are provided with elliptical portions 20 which engage similarly shaped openings formed in the washer 22.

As shown in Figures 1 and 2 the fasteners 18 are extenuated at the points where ties are located in order that they may extend completely through the latter and in the space between adjacent ties they are abbreviated.

It will be understood from an inspection of the drawings that by tightening the nuts or locking members 30 with which the fasteners are provided that an extremely rigid connection may be effected between the splice bars, rails, tie plate and ties. Furthermore such connection is extremely simple in design and is such as to permit facile assembling and disassembling. In short, if any parts become worn they may be replaced merely by removing the locking members 30 without necessitating first the removal of the bolts or fasteners 18.

It is important that assemblages of this character should be sufficiently strong to resist adequately the tendency toward vertical displacement that is incurred when a heavy train crosses the joint, but it is likewise important that the assemblage be resilient enough to absorb the jars and vibrations that are imparted to it. The present invention aims directly toward the accomplishment of these ends and the structures disclosed herein are obviously qualified to serve these purposes.

It is to be appreciated that certain modifications, alterations and improvements in the design and arrangement of the parts may be made from time to time without departing from the scope of the invention as set forth in the appended claims.

Having thus described my invention, what I claim is new and desire to secure by United States Letters Patent is:

1. A rail joint assemblage comprising, in combination, a tie plate adapted to underlie the base flanges of the rails forming the joint, splice bars extending on opposite sides of the webs of the rails forming the joint, and means securing the splice bars against excessive movement relatively to the tie plate, said means comprising bolts extending completely through alined openings in the splice bars, the tie plate and the tie.

2. A rail joint assemblage comprising, in combination, a tie plate adapted to be disposed beneath the rail and above the tie, said plate having shoulders for positioning the base flange of the rail, the splice bars extending along the opposite sides of the rail and arranged to span a joint therein, and means urging the splice bars firmly into engagement with the rail and fasteners extending through the splice bars and the tie plate and into the tie for maintaining the parts in firm assembled relationship.

3. A rail joint assemblage comprising, in combination, a tie plate interposed between the rail and the tie, splice bars adapted to extend along the opposite sides of the rail to span the joint therein, said splice bars being provided with outwardly extending portions positioned in spaced relation to the tie plate, means normally urging the splice bars into firm engagement with the opposite sides of the rail, and means engaging the outwardly extending portions of the bars for holding them against displacement relatively to the tie.

Signed at Chicago, Illinois, this 7th day of June, 1930.

JOHN BRUNNER.